United States Patent
Pankajkshan et al.

(10) Patent No.: US 8,547,937 B1
(45) Date of Patent: Oct. 1, 2013

(54) SYSTEM AND METHOD FOR PROVIDING SELECTIVE VOICE CALL CONTINUITY

(71) Applicant: MetroPCS Wireless, Inc., Richardson, TX (US)

(72) Inventors: Bejoy Pankajkshan, Plano, TX (US); Erik Karel Kosar, Richardson, TX (US); Robert Wondoloski, Richardson, TX (US)

(73) Assignee: MetroPCS Wireless, Inc., Richardson, TX (US)

( * ) Notice: Subject to any disclaimer, the term of this patent is extended or adjusted under 35 U.S.C. 154(b) by 0 days.

(21) Appl. No.: 13/785,492

(22) Filed: Mar. 5, 2013

Related U.S. Application Data

(63) Continuation of application No. 13/549,683, filed on Jul. 16, 2012, now Pat. No. 8,428,032.

(51) Int. Cl.
*H04W 4/00* (2009.01)

(52) U.S. Cl.
USPC .......................................................... 370/331

(58) Field of Classification Search
None
See application file for complete search history.

(56) References Cited

U.S. PATENT DOCUMENTS

| | | | |
|---|---|---|---|
| 2007/0149166 A1* | 6/2007 | Turcotte et al. | 455/404.1 |
| 2007/0183411 A1* | 8/2007 | Song et al. | 370/352 |
| 2007/0217354 A1* | 9/2007 | Buckley | 370/328 |
| 2007/0238466 A1* | 10/2007 | Buckley et al. | 455/445 |
| 2007/0254625 A1* | 11/2007 | Edge | 455/404.1 |
| 2009/0052399 A1* | 2/2009 | Silver et al. | 370/331 |
| 2009/0219843 A1* | 9/2009 | Chin et al. | 370/310 |
| 2009/0252059 A1* | 10/2009 | Vigue et al. | 370/254 |
| 2010/0008340 A1* | 1/2010 | Li et al. | 370/338 |
| 2010/0008353 A1* | 1/2010 | Li | 370/352 |
| 2010/0091706 A1* | 4/2010 | Noldus et al. | 370/328 |

* cited by examiner

*Primary Examiner* — Otis L Thompson, Jr.
(74) *Attorney, Agent, or Firm* — Howison & Arnott, L.L.P.

(57) ABSTRACT

A method for selectively establishing a voice call continuity link between a mobile device and a voice call continuity application server includes the steps of receiving a request to establish a voice over IP call connection at the voice call continuity application server from the mobile device, the request including mobile device location information for the mobile device. The method determines at the voice call continuity application server whether the voice call continuity link is needed between the voice call continuity server and the mobile device responsive to the mobile device location information within the request and network location information stored within a database associated with the voice call continuity application server. The method establishes the voice call continuity link between the mobile device and the voice call continuity application responsive to a determination that the voice call continuity link is needed.

22 Claims, 2 Drawing Sheets

SYSTEM AND METHOD FOR PROVIDING SELECTIVE VOICE CALL CONTINUITY

CROSS-REFERENCE TO RELATED APPLICATIONS

This application is a continuation of U.S. patent application Ser. No. 13/549,683, filed Jul. 16, 2012, entitled SYSTEM AND METHOD FOR PROVIDING SELECTIVE VOICE CALL CONTINUITY, the specification of which is incorporated herein in its entirety.

TECHNICAL FIELD

The present invention relates to the use of Voice Call Continuity (VCC) links within a Voice over IP call, and more particularly, to a system and method for selectively using Voice Call Continuity links with a Voice over IP call based upon available networks.

BACKGROUND

The Voice Call Continuity (VCC) specification describes how a voice call can be maintained as a mobile device moves between a circuit switch network and a packet-switched network. Within a standard VoIP call, the operation of the mobile devices are controlled by the IP infrastructure. However, within the VCC specification, calls to and from a mobile device in the circuit switch domain are also anchored to the IP domain, for example, the IP Multimedia Subsystem (IMS). As the handset becomes attached and detached from wireless access points, such as Wi-Fi hotspots, a client application within the mobile device provides notification of the radio conditions through a VCC platform within the network. This enables circuit switched and IP switched call links to be originated and terminated in a transparent manner such that each path is automatically transferred between domains.

Current VCC solutions anchor all VoIP originated calls to the IMS VCC application server within the IMS network. This is irrespective of whether the VoIP calls eventually are handed down to another Radio Access Technology (RAT) such as eHRPD or 1xRTT. The need for always anchoring these calls within the IMS network results in higher licensing costs for use of the VCC application server.

SUMMARY

The present invention as disclosed and described herein, in one aspect thereof, comprises a method for selectively establishing a voice call continuity link between a mobile device and a voice call continuity application server and includes the steps of receiving a request to establish a voice over IP call connection at the voice call continuity application server from the mobile device. The request includes mobile device location information for the mobile device. The method determines at the voice call continuity application server whether the voice call continuity link is needed between the voice call continuity server and the mobile device responsive to the mobile device location information within the request and network location information stored within a database associated with the voice call continuity application server. The method establishes the voice call continuity link between the mobile device and the voice call continuity application responsive to a determination that the voice call continuity link is needed.

BRIEF DESCRIPTION OF THE DRAWINGS

For a more complete understanding, reference is now made to the following description taken in conjunction with the accompanying Drawings in which.

DETAILED DESCRIPTION

Figure 1:
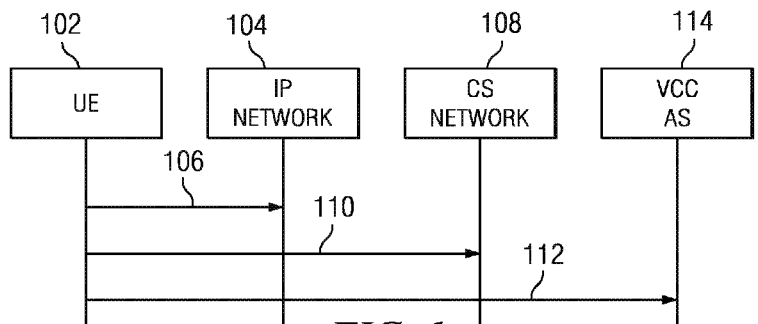
FIG. 1 is an illustration of the manner for connecting a VoIP call and the anchoring of the call within the IMS domain.

Referring now to the drawings, wherein like reference numbers are used herein to designate like elements throughout, the various views and embodiments of a system and method for providing selective voice call continuity are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to the drawings, and more particularly to FIG. 1, there is illustrated the manner for establishing a call connection using a Voice Call Continuity connection within the IP Media Subsystem (IMS). The user equipment 102 initially establishes a Voice over IP connection 106 with the IP network 104. At the same time the Voice over IP connection 106 is established, a call may also be anchored in the IMS domain by establishing a connection with the Voice Call Continuity application server (VCC AS) 114. By establishing a call anchor link 112 with the VCC application server 114, the Voice over IP call can be established using an IP link 106 within the IP network 104, or alternatively, a circuit switched call link 110 can be established between the user equipment 102 and a circuit switch network 108. Using the Voice Call Continuity link 112, the Voice call connection from the user equipment 102 can be switched between the IP network link 106 and the circuit switched network link 110 as necessary in order to maintain the call connection with the user equipment 102.

Figure 2:
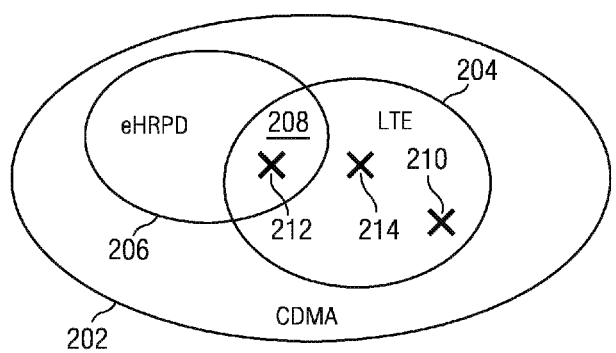
FIG. 2 illustrates various locations of a mobile device with respect to networks which may or may not require a Voice Call Continuity connection.

Referring now to FIG. 2, there are illustrated various user equipment positions within a number of different networks that may or may not require the establishment of a Voice Call Continuity anchor to the VCC application server as described herein. A mobile network may comprise a CDMA network, GSM network, etc. A mobile network 202 encompasses the entire area illustrated therein, and within the mobile network is an LTE network 204, and an eHRPD network 206. The eHRPD network 206 and LTE network 204 overlap generally in an area indicated at 208. The LTE network 204 comprises a 3GPP long-term evolution network that provides wireless communications of high-speed data for mobile telephones and data terminals. The eHRPD network 206 comprises a Radio Access Technology network and depending upon the position of a mobile station there may or may not be a need to establish a Voice Call Continuity connection with the VCC application server 114 when establishing a Voice over IP call for a particular mobile device. When a mobile device is at a location indicated generally by 210, the mobile device is within the LTE network 204 and the mobile network 202. Should the IP network connection be lost, the mobile device 210 is not near a location where it may likely easily establish a connection via the eHRPD network. Thus, there is a need to establish Voice Call Continuity anchor with the VCC application server 114 in order to assist in hand-offs with a call from the mobile device 210 between IP networks and circuit switched networks.

On the other hand, a call established from a mobile device at a location generated generally at 212 is located within the LTE network 204, eHRPD network 206 and mobile network 202. As this mobile device is located within the eHRPD network 206, a packet switched handoff between LTE and eHRPD can occur without using an external VCC server. Thus, in this case the Voice Call Continuity anchor with the VCC application server 114 would not be necessary since a packet switched handoff between LTE and eHRPD can be made without using an external VCC server.

If a mobile device was located at a location 214 within the LTE network near the boundary of the eHRPD network 206, the need for establishing the Voice Call Continuity anchor with the VCC application server 114 may depend on a number of different things. If it is determine that the mobile device is moving toward the eHRPD network, a Voice Call Continuity anchor might not be established as the eHRPD network would be able to support the device. However, if the mobile device at location 214 were stationary or moving away from the eHRPD network 206, a Voice Call Continuity anchor might be established in order to ensure maintenance of a voice call connection with the device.

Figure 3:
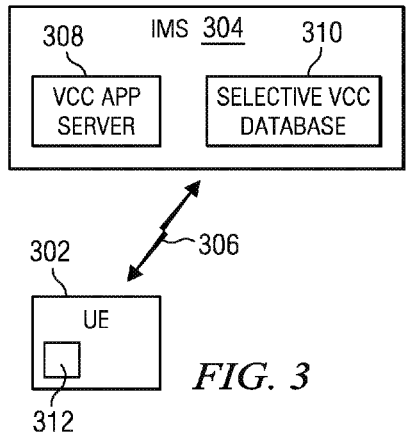
FIG. 3 illustrates a block diagram of the components used for determining whether to establish a Voice Call Continuity connection.

Referring now to FIG. 3, there is illustrated the environment for the establishment of a Voice over IP call between user equipment 302 and the IP Multimedia Subsystem 304. The user equipment 302 may comprise any type of mobile device, such as a phone, lap top, PDA, etc. When the user equipment 302 attempts to establish a Voice over IP call link 306 with the IMS subsystem 304, a determination must be made as to whether or not to establish a link between the user equipment 302 and the Voice Call Continuity application server 308. This decision is made within a Voice Call Continuity application server (VCC AS) 308 using information within a selective Voice Call Continuity database 310 located within the IMS subsystem 304 and associated with the VCC application server 308. The selective VCC database 310 enables the VCC application server 308 to selectively decide if a Voice Call Continuity anchor needs to be established between the VCC application server 308 and the user equipment 302 for a particular VoIP call.

The selective VCC database 310 includes location information with respect to the coverage areas of eHRPD and 1xRTT networks and the coverage area of LTE networks. This enables a determination of whether a user equipment 302 originated from an area where eHRPD is not available and the LTE coverage area overlaps with a 1xRTT network. Thus, if it is determined that a user may move out of the LTE coverage area and not be automatically picked up by an eHRPD network, the call can potentially be dropped if a VCC anchor is not engaged for the call. In these situations a VCC call anchor would be established. However, if the selected VCC database 310 enables a determination that an eHRPD network would be available to the user equipment 302, the VCC call anchor would not be required as the call would not be dropped if the user moves out of the VCC network.

Figure 4:
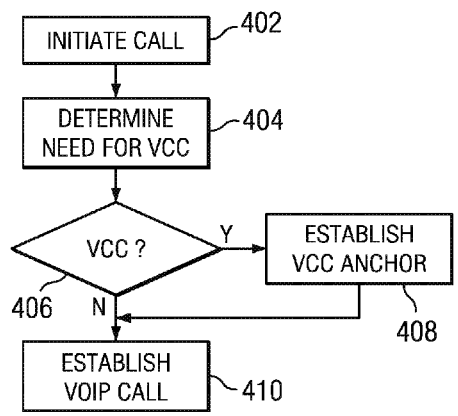
FIG. 4 is a flow diagram describing the manner for determining whether to establish a Voice Call Continuity connection.

Referring now to FIG. 4, there is more fully illustrated a general flow diagram of the process for determining whether to establish a VCC call anchor using the selected VCC database 310. The user equipment 302 initiates a Voice over IP call at step 402 to a particular destination. The call connection protocol contacts the VCC application server 308 and selective VCC database 310 to determine if there is a need for a Voice Call Continuity connection with respect to the existing call based upon the position of the user equipment 302 with respect to the available networks. Inquiry step 406 determines if a Voice Call Continuity link should be established, and if so, establishes the Voice Call Continuity anchor between the user equipment 302 and the VCC application server 308 at step 408. If inquiry step 406 determines that there is no need for a Voice Call Continuity anchor due to a sufficient alternative network structure for supporting the Voice over IP call, the Voice over IP call is established at step 410 without the establishment of the VCC anchor.

Figures 5, 6, 7:
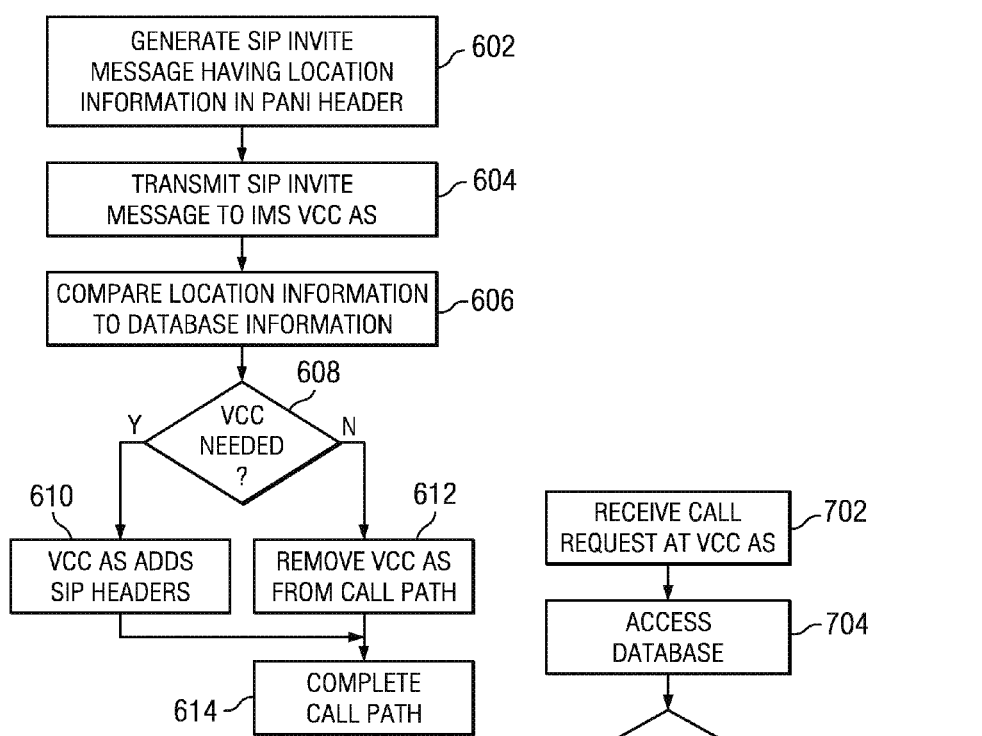
FIG. 5 illustrates the manner for including mobile device location information within a PANI header.
FIG. 6 is a flow diagram describing the manner for determining whether to establish a Voice Call Continuity connection according to the present disclosure.
FIG. 7 is a flow diagram describing operation of a VCC application server.

In order for the VCC application server 308 and selective VCC database 310 to be able to determine whether or not to establish the VCC anchor between the user equipment 302 and the VCC application server 308, the present location of the user equipment 302 must be provided to the VCC application serve 308 so it may be compared with the networks available for the call. This is achieved using a SIP Invite Message 502, as illustrated in FIG. 5, that is transmitted from a SIP client 312 located up on the user equipment 302. The SIP client 312 within the user equipment 302 generates the SIP invite message 502 for transmission to the VCC application server 308. Within the PANI header 504 of the SIP invite message 502, the SIP client 312 will place location information 504. This location information 506 provides the present location of the user equipment 302 enabling the VCC application server 308 and the associated selected VCC database 310 to determine whether or not a Voice Call Continuity anchor is needed for the requested Voice over IP call.

Referring now to FIG. 6, there is provided a flow diagram more fully describing the establishment of a selective Voice Call Continuity connection between user equipment 302 and a VCC application server 308 according to the present disclosure. Upon initial establishment of a Voice over IP call from the user equipment 302, the SIP client 312 within the user equipment 302 originates a SIP invite message. Within the SIP invite message, the invite PANI header 504 has included therein location information in addition to the access network information at step 602. The generated SIP invite message is transmitted at step 604 to the IMS VCC application server 308 through IMS proxies. Upon receipt at the VCC application server 308, the selective VCC database at 310 looks at the provided location information 506 within the PANI header 504 and compares this at step 606 with the network database information stored within the selective VCC database 310. Responsive to the comparison, inquiry step 608 determines if a Voice Call Continuity connection anchor is needed between the VCC application server 308 and the user equipment 302. If inquiry step 608 determines that the call was originated in an area where eHRPD is not available and the LTE coverage area does not overlap with a 1xRTT network, the determination may be made that if the user moves out of the LTE coverage area the call will be dropped without a VCC anchor within the call. Thus, the VCC application server 308 will add a SIP header (e.g., Route header) to establish a VCC call anchor between the user equipment 302 and the VCC application server 308. However, if inquiry step 608 determines that the call would not be dropped if it left the LTE coverage area, the VCC application server 308 will remove itself from the call path at step 612. Once it is established that the VCC application server 308 is not needed at 612 or that the VCC call anchor is established at step 610, the call path may be completed at step 614.

In this manner, a determination may be made as to the necessity of a VCC call anchor with respect to the establishment of a Voice over IP call. In cases where the VCC anchor is not needed, the process selectively determines not to establish the connection thus saving the network provider the cost of establishing the link with a VCC application server 308. In cases where it is determined that the VCC anchor link is necessary such link will be maintained in order to help the user maintain call continuity within their Voice over IP call.

Referring now to FIG. 7, there is illustrated the manner in which the VCC application server 308 may utilize the location information 506 within the information received from the user equipment 302 and the selective VCC database 310 information. The call request from the user equipment is received at step 702 by the VCC application server 308. The VCC application server 308 accesses the selective VCC database at 310 and utilizes the available information along with location information provided by the call request to determine at inquiry step 706 whether the call was originated in an area where an eHRPD network was not available. If an eHRPD network is not available, inquiry step 708 determines if the LTT coverage area in which the user equipment 302 presently resides only overlaps a 1xRTT network. If so, the system establishes a VCC anchor between the user equipment 302 and the VCC application server 308 at step 710. In this case, it has been established at inquiry step 706 that there is no eHRPD network available for supporting the call if it is dropped from the IP network and it is established at inquiry step 708 that no other networks are available for taking up the call if it is dropped from the LTE network.

However, if inquiry step 706 determines that an eHRPD network is available and would be able to support a call dropped from the IP network or if inquiry step 708 determines that there are other networks that are overlapping with the LTE network other than the 1 xRTT network no VCC anchor would be established at step 712 since the eHRPD network would be available to support calls dropped from the IP network or the additional networks overlapping the LTE network would be able to do so. Other factors which may be used to determine whether the call needs to have a VCC anchor include the speed at which the mobile device is moving and a determination of whether the mobile device is mobile or stationary. If the mobile device is moving at a high rate of speed or moving at all, the call is more likely to leave a network area supporting and IP call. When a mobile device is stationary there is less of a need for an anchor since the call is not likely to be dropped. These details may be obtained from the SIP client within the mobile device using additional SIP headers.

It will be appreciated by those skilled in the art having the benefit of this disclosure that this system and method for providing selective voice call continuity provides a cost effective manner for determining whether to establish a VCC link. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for selectively establishing a voice call continuity link between a mobile device and a voice call continuity application server, comprising:
   receiving a request to establish a voice connection at the voice call continuity application server from the mobile device;
   determining at the voice call continuity server a position of the mobile device with respect to at least one network defined by network location information that can support a voice call if the voice call is dropped by serving network responsive to the request;
   comparing the determined position of the mobile device with network location information stored in a database for at least one network that can support the voice call if it is dropped by the voice network;
   determining at the voice call continuity application server whether the voice call continuity link is needed between the voice call continuity server and the mobile device responsive to the comparison; and
   establishing the voice call continuity link between the mobile device and the voice call continuity application responsive to a determination that the voice call continuity link is needed.

2. The method of claim 1 further including the step of establishing a voice over IP call connection without the voice call continuity link responsive to a determination that the voice call continuity link is not needed.

3. The method of claim 1, wherein the step of determining further comprises:
   extracting the mobile device location information from the request.

4. The method of claim 1, wherein the step of determining a position further comprises:
   accessing a database associated with the voice call continuity server;
   determining if the mobile device is within an area where a first network that does not enable transition between a 3G and an LTE network is not available; and
   determining if the network supporting the mobile device overlaps with a 3G CS voice network.

5. The method of claim 4, wherein the step of establishing the voice call continuity link between the mobile device and the voice call continuity application server occurs responsive to a determination that the mobile device is not within the area where the first network is available and the voice network supporting the mobile device only overlaps with a 3G CS voice network.

6. The method of claim 4 further including the step of establishing a voice call connection without the voice call continuity link responsive to a determination that either the mobile device is within the area where the first network is available or the IP network supporting the mobile device does not overlap with the 3G CS voice network.

7. The method of claim 1 further including the step of generating the request at a SIP client within the mobile device.

8. The method of claim 7, wherein the step of generating the request further comprises the step of generating a SIP (Session Initiation Protocol) INVITE message having the mobile device location information within a PANI (P-Access-Network-Info) header of the SIP INVITE message as the request.

9. A method for selectively establishing a voice call continuity link between a mobile device and a voice call continuity application server, comprising:
   accessing network location information for at least one network that can support a voice call if it is dropped by a voice network from a database associated with the voice call continuity application server;
   determining a position of the mobile device with respect to the at least one network defined by the network location information that can support the voice call if it is dropped by the voice network;
   comparing the determined position of the mobile device with network location information stored in a database for at least one network that can support the voice call if it is dropped by the voice network;
   determining by the voice call continuity application server whether the voice call continuity link is needed between the voice call continuity server and the mobile device responsive to the comparison;
   establish the voice call continuity link between the mobile device and the voice call continuity application responsive to a determination that the voice call continuity link is needed.

10. The method of claim 9, wherein the step of determining a position further comprises:
   determining if the mobile device is within an area where a first network that does not enable transition between a 3G and an LTE network is not available; and
   determining if the IP network supporting the mobile device overlaps with a 3G CS voice network.

11. The method of claim 10, wherein the step of establishing the voice call continuity link between the mobile device and the voice call continuity application server occurs responsive to a determination that the mobile device is not within the area where the first network is available and the IP network supporting the mobile device only overlaps with the 3G CS voice network.

12. The method of claim 10, wherein the step of establishing the voice over IP call connection without the voice call continuity link responsive to a determination that either the mobile device is within the area where the first network is available or the IP network supporting the mobile device does not overlap with the 3G CS voice network.

13. The method of claim 9 further including the step of generating the request at a SIP client within the mobile device.

14. The method of claim 13, wherein the step of generating the request further comprises the step of generating a SIP INVITE message having the mobile device location information within a PANI header of the SIP INVITE message as the request.

15. A system for selectively establishing a voice call continuity link, comprising:
   a voice call continuity application server for determining whether the voice call continuity link is needed between the voice call continuity server and the mobile device responsive to a position of the mobile device with respect to at least one network, defined by network location information, that can support a voice call if voice network drops the voice call;
   a database associated with the voice call continuity application server for storing the network location information for at least one network that can support the voice call if it is dropped by the voice network; and
   wherein the voice call continuity application server establishes the voice call continuity link between the mobile device and the voice call continuity application responsive to a determination that the voice call continuity link is needed based upon a comparison of the position of the mobile device and the network location information for the at least one network.

16. The system of claim 15 further including a voice network server for establishing a voice call connection without the voice call continuity link responsive to a determination that the voice call continuity link is not needed.

17. The system of claim 15, wherein the voice call continuity application server further extracts the mobile device location information from the request and determines the position of the mobile device with respect to at least one network defined by the network location information that can support the voice call if it is dropped by the voice network.

18. The system of claim 15, wherein the voice call continuity application server further accesses the database associated with the voice call continuity server and determines if the mobile device is within an area where a first network that does not enable transition between a 3G and an LTE network is not available and if the voice network supporting the mobile device overlaps with a 3G CS voice network.

19. The system of claim 18, wherein the voice call continuity application server establishes the voice call continuity link between the mobile device and the voice call continuity application server responsive to a determination that the mobile device is not within the area where the first network is available and the voice network supporting the mobile device only overlaps with the 3G CS voice network.

20. The system of claim 18 further including an IP network server for establishing a voice call connection without the voice call continuity link responsive to a determination that either the mobile device is within the area where the first network is available or the voice network supporting the mobile device does not overlap with the 3G CS voice network.

21. The system of claim 15 further including a SIP client within a mobile device for generating the request.

22. The system of claim 21, wherein the SIP client further generates the request as a SIP INVITE message having the mobile device location information within a PANI header of the SIP INVITE message.

* * * * *